United States Patent [19]

Matsumura et al.

[11] Patent Number: 4,517,315
[45] Date of Patent: * May 14, 1985

[54] PRODUCTION OF A FILM-LIKE OR FIBROUS STRUCTURE OF AN AROMATIC POLYESTER

[75] Inventors: Shunichi Matsumura, Hachioji; Hiroo Inata, Hino, both of Japan

[73] Assignee: Teijin Limited, Osaka, Japan

[*] Notice: The portion of the term of this patent subsequent to Dec. 6, 2000 has been disclaimed.

[21] Appl. No.: 340,036

[22] Filed: Jan. 18, 1982

[30] Foreign Application Priority Data

Jan. 27, 1981 [JP] Japan .................................. 56-9606
Jan. 30, 1981 [JP] Japan .................................. 56-11547
Sep. 18, 1981 [JP] Japan ................................ 56-146199

[51] Int. Cl.$^3$ ....................... B29D 27/00; C08G 8/00
[52] U.S. Cl. ...................................... 521/64; 264/49; 264/210.1; 264/344; 264/DIG. 13; 521/182; 528/289; 528/502
[58] Field of Search ............... 264/211, 49, 91, 210.2, 264/344, DIG. 13; 528/502, 289; 521/64, 182

[56] References Cited

U.S. PATENT DOCUMENTS

| | | | |
|---|---|---|---|
| 2,212,772 | 8/1940 | Graves | 264/211 |
| 2,214,442 | 9/1940 | Spanagel | 264/211 |
| 2,323,383 | 7/1943 | Dreyfus | 264/178 F |
| 2,856,636 | 10/1958 | Schulkem et al. | 264/211 |
| 2,996,466 | 8/1961 | Kessler et al. | 264/211 |
| 3,029,226 | 4/1962 | Kessler et al. | 264/211 |
| 3,037,956 | 6/1962 | Kessler et al. | 264/211 |
| 3,386,795 | 6/1968 | Caldwell et al. | 8/100 |
| 3,446,758 | 5/1969 | Wiener | 521/48.5 |
| 3,536,796 | 10/1970 | Rock | 264/49 |
| 3,719,727 | 3/1973 | Masai et al. | 525/437 |
| 3,951,920 | 4/1976 | Senoo et al. | 521/64 |
| 3,957,905 | 5/1976 | Sumoto et al. | 525/437 |
| 4,182,582 | 1/1980 | Youval et al. | 264/49 |
| 4,196,066 | 4/1980 | Inata et al. | 264/211 |
| 4,220,563 | 9/1980 | Hara et al. | 521/48.5 |
| 4,247,498 | 1/1981 | Castro | 264/49 |
| 4,291,152 | 9/1981 | Inata et al. | 528/289 |
| 4,331,800 | 5/1982 | Inata et al. | 528/289 |
| 4,351,936 | 9/1982 | Inata et al. | 528/289 |
| 4,386,174 | 5/1983 | Cogswell et al. | 528/502 |
| 4,416,839 | 11/1983 | Inata et al. | 521/64 |
| 4,419,308 | 12/1983 | Matsumura et al. | 521/64 |

FOREIGN PATENT DOCUMENTS

| | | | |
|---|---|---|---|
| 54-21454 | 2/1979 | Japan | 264/49 |
| 54-116051 | 9/1979 | Japan | 264/49 |

OTHER PUBLICATIONS

Schlack, Alien Property Custodian, Ser. No. 358,465, published Apr. 27, 1943.

Primary Examiner—Philip Anderson
Attorney, Agent, or Firm—Sherman & Shalloway

[57] ABSTRACT

A process for producing a film-like or fibrous structure of an aromatic polyester, which comprises (1) forming an unstretched film-like or fibrous structure by melt-shaping a blend comprising 100 parts by weight of (A) an aromatic polyester having a high degree of polymerization derived from an aromatic dicarboxylic acid as a main acid component and an aliphatic diol and/or an alicyclic diol as a main glycol component and (B) 3 to 300 parts by weight of a low-molecular-weight compound being substantially non-reactive with the aromatic polyester (A) and having a boiling point of at least about 200° C. under atmospheric pressure and a molecular weight of not more than 1,000, (2) stretching the resulting film-like or fibrous structure, (3) extracting at least a major portion of the low-molecular-weight compound from the stretched film-like or fibrous structure by using an organic solvent which does not substantially dissolve the aromatic polyester under the extracting conditions, and (4) if desired, heat-setting the film-like or fibrous structure after the stretching step (2) and/or the extracting step (3).

The film-like or fibrous structure of an aromatic polyester prepared by the process substantially contains no low-molecular-weight compound or contains the low-molecular-weight compound in an amount of up to about 1 part by weight at most per 100 parts by weight of the aromatic polyester.

25 Claims, No Drawings

PRODUCTION OF A FILM-LIKE OR FIBROUS STRUCTURE OF AN AROMATIC POLYESTER

This invention relates to a process for producing a film-like or fibrous structure of an aromatic polyester. More specifically, it relates to a process comprising the steps of forming a film-like or fibrous structure by melt-shaping a blend comprising an aromatic polyester having a high degree of polymerization and a melt viscosity-reducing agent, stretching the resulting structure and then removing the melt viscosity-reducing agent from the stretched structure by extraction.

Because of their excellent mechanical properties, chemical resistance, dimensional stability, etc., aromatic polyesters, especially polyethylene terephthalate and polytetramethylene terephthalate, have been used in various applications, for example for the production of fibers, films and injection-molded articles.

In particular, the mechanical properties of these polyesters depend greatly on their degree of polymerization, and various methods for the production of polyesters having the highest possible degrees of polymerization have been investigated and suggested in the past.

Since the melt polymerization involved in the production of polyesters is usually a condensation reaction at high temperatures side-reactions such as thermal decomposition reaction tend to take place to cause various troubles. For example, a long period of time is required to produce polymers of high degrees of polymerization. Or the degree of polymerization rather decreases once it has increased to a certain point. As attempts for remedying these defects, methods involving solid-phase polymerization and methods involving using polymerization promoters such as diphenyl carbonate and diphenyl terephthalate have been well known.

When a polymer having a high degree of polymerization produced by such a prior method is melt-shaped, it is very difficult to obtain a shaped article still having a high degree of polymerization by minimizing the decrease of the polymerization degree. This is because the polymer chain undergoes cleavage at high temperatures used in the melt-shaping. These high temperatures are necessary in order to reduce the very high melt viscosity of polymers having a high degree of polymerization and to facilitate their melt shaping.

It is an object of this invention therefore to provide a process for producing a film-like or fibrous structure of an aromatic polyester having a high degree of polymerization while minimizing the decrease of the degree of polymerization during melt shaping.

Another object of this invention is to provide a process for producing a film-like or fibrous structure of an aromatic polyester having a high degree of polymerization by minimizing the decrease of the degree of polymerization during melt shaping at relatively low temperatures.

Still another object of this invention is to provide a process for producing a shaped article having superior properties, such as superior mechanical properties such as high strength and elongation, and high wet heat resistance, than a similar article composed of an aromatic polyester having a high degree of polymerization which is obtained by a conventional method.

A further object of this invention is to provide a process for producing a film-like or fibrous structure of an aromatic polyester having a high degree of polymerization which has a very low oligomer content, for example, an oligomer content of not more than about 0.1% by weight.

An additional object of this invention is to provide a process for producing a film-like structure having a very small thickness, for example a thickness of not more than 1 micron, and a fibrous structure having a very small size, for example a diameter of not more than 3 microns.

These objects and advantages of this invention are achieved in accordance with the invention by a process for producing a film-like or fibrous structure of an aromatic polyester which comprises (1) forming an unstretched film-like or fibrous structure by melt-shaping a blend comprising 100 parts by weight of (A) an aromatic polyester having a high degree of polymerization derived from an aromatic dicarboxylic acid as a main acid component and an aliphatic diol and/or an alicyclic diol as a main glycol component and (B) 3 to 300 parts by weight of a low-molecular-weight compound being substantially non-reactive with the aromatic polyester (A) and having a boiling point of at least about 200° C. under atmospheric pressure and a molecular weight of not more than 1,000, (2) stretching the resulting film-like or fibrous structure, (3) extracting at least a major portion of the low-molecular-weight compound from the stretched film-like or fibrous structure by using an organic solvent which does not substantially dissolve the aromatic polyester under the extracting conditions, and (4) if desired, heat-setting the film-like or fibrous structure after the stretching step (2) and/or the extracting step (3).

The characteristic feature of the process of this invention resides in the combination of the steps (1), (2) and (3). This feature is conceptually explained below. For example, polyethylene terephthalate having a very high degree of polymerization represented by an intrinsic viscosity of at least 1, because of its high melt viscosity, can be melt-shaped only at a temperature of 320° C. or higher. Even this polymer can be melt-shaped according to the process of this invention at a relatively low melting temperature of, for example, about 280° C. A first advantage gained from the shapability of a polymer of a high degree of polymerization at such a low melting temperature is that not only a low melting temperature can be employed in the shaping operation, but also the decrease of the degree of polymerization during the melt-shaping step can be limited to a very small extent and the high degree of polymerization of the starting polymer can be retained in the resulting shaped article. Accordingly, a shaped article composed of a polymer having a high degree of polymerization can be easily produced by the process of this invention. Since the decrease of the degree of polymerization is small, the shaped article has excellent properties which remarkably reflect the inherent properties of the starting polymer having a high degree of polymerization.

A second advantage gained from the shapability of the polymer having a high degree of polymerization at such low melting temperatures is that even a very thin film-like structure having a thickness of, for example, 1 micron or a very thin fibrous structure having a diameter of, for example, 3 microns, both of which have high performance, can be produced stably from an aromatic polyester having a high degree of polymerization while minimizing the decrease of the degree of polymerization. According to the process of this invention, such a very thin film-like or fibrous structure is subjected to the extracting operation to remove the melt viscosity-reducing agent contained therein whereby a thinner structure, for example a film-like structure having a thickness of 0.8 micron, can be formed.

Surprisingly, the film-like structure produced by the process of this invention, even when it is produced from an aromatic polyester blend containing 50% by weight of the melt viscosity-reducing agent, has sufficient air-tightness such that irrespective of its thickness, it shows a water permeability equal to that of a film-like structure produced from the aromatic polyester alone.

The aromatic polyester (A) used in the process of this invention is derived from an aromatic dicarboxylic acid as a main acid component and an aliphatic diol and/or an alicyclic diol as a main glycol component.

Examples of the aromatic dicarboxylic acid include terephthalic acid, isophthalic acid, naphthalenedicarboxylic acid, diphenyldicarboxylic acid, diphenylsulfonedicarboxylic acid, diphenoxyethanedicarboxylic acid, diphenyl ether dicarboxylic acid, methylterephthalic acid and methylisophthalic acid.

Examples of the aliphatic diol and/or alicyclic diol as the main glycol component include polymethylene glycols having 2 to 10 carbon atoms (such as ethylene glycol, trimethylene glycol, tetramethylene glycol, hexamethylene glycol and decamethylene glycol), neopentylene glycol, cyclohexane dimethylol, tricyclodecane dimethylol, 2,2-bis(4-beta-hydroxyethoxyphenyl)-propane, 4,4'-bis(beta-hydroxyethoxy)diphenylsulfone, diethylene glycol, polyoxyalkylene glycols (such as polyoxyethylene glycol, polyoxypropylene glycol, polyoxytrimethylene glycol and polyoxytetramethylene glycol), and copolyoxyalkylene glycols composed of two or more of the aforesaid oxyalkylenes as repeating structural units. The acid component and the glycol component may each comprise two or more compounds.

Terephthalic acid is preferred as the acid component, and polymethylene glycols having 2 to 6 carbon atoms are preferred as the glycol component.

Thus, examples of the aromatic polyester (A) are polyethylene terephthalate, polytrimethylene terephthalate, polytetramethylene terephthalate, poly(ethylene 2,6-naphthalene dicarboxylate), poly(ethylene terephthalate/ethylene isophthalate), and poly(ethylene terephthalate/neopentylene terephthalate). Of these, polyethylene terephthalate is preferred.

The aromatic polyester (A) may contain, either in the copolymerized or bonded state, units derived from a monofunctional compound such as benzoic acid, or a polyfunctional compound, for example a hydroxycarboxylic acid such as p-hydroxybenzoic acid, an aliphatic dicarboxylic acid such as succinic acid, adipic acid or sebacic acid, pentaerythritol, trimethylolpropane, trimellitic acid, or pyromellitic acid.

The aromatic polyester (A) used in this invention has an intrinsic viscosity of preferably at least 0.6, more preferably at least 0.7, and especially preferably at least 0.8.

The intrinsic viscosity is measured at 35° C. in an o-chlorophenol solution, and is often represented in this specification by the symbol $[\eta]$.

The aromatic polyester used in the process of this invention can be produced by methods known per se, such as a melt-polymerization method or a solid-phase polymerization method. Aromatic polyesters having an especially high degree of polymerization, for example those having an intrinsic viscosity of more than about 0.8, can be advantageously produced by a melt-polymerization method involving the use of various polymerization promoters [such as diphenyl carbonate (U.S. Pat. No. 3,444,141), diphenyl terephthalate (U.S. Pat. No. 3,433,770), tetraphenyl orthocarbonate (U.S. Pat. No. 3,714,115), bis-cyclic imino esters (U.S. Pat. No. 4,291,152 and European Patent Application No. 0019061), and bis-cyclic imino ethers (U.S. patent application Ser. No. 144,032 and European Patent Application No. 0020944)].

The melt viscosity-reducing agent used in the process of this invention is the low-molecular-weight compound (B) which is substantially non-reactive with the aromatic polyester (A) and has a boiling point under atmospheric pressure of at least about 200° C. and a molecular weight of not more than 1,000. Preferred are those having a boiling point of at least about 250° C. or a molecular weight of not more than 800. Those low-molecular-weight compounds which have a melting point of at least 100° C. in addition to the aforesaid physical constants are especially preferred in this invention because when blended with the aromatic polyesters (A), they either increase the second order transition point of the polyesters or reduce it only to a small extent, and an operation of molding the blends can be easily performed.

Examples of the low-molecular-weight compound (B) used in this invention include imide compounds of formula (1)-a

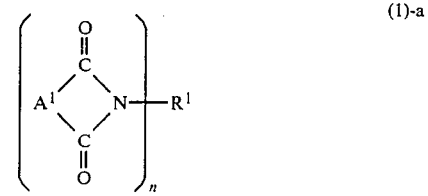

(1)-a wherein $A^1$ represents a divalent aromatic group or linear or cyclic aliphatic group which may be substituted; $R^1$ represents an aromatic group or linear or cyclic aliphatic group having a valence of n which may be substituted; n is 1 or 2; and the imide ring is 5- or 6-membered, imide compounds of formula (1)-b

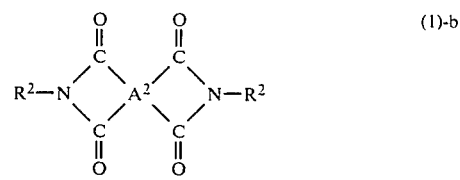

(1)-b wherein $A^2$ represents a tetravalent aromatic group which may be substituted; $R^2$ represents a monovalent linear or cyclic aliphatic group which may be substituted; and the imide rings are 5- or 6-membered, trialkyl isocyanurates of formula (1)-c

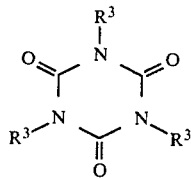
(1)-c wherein R³ represents a monovalent alkyl group, diphenyl compounds of formula (1)-d

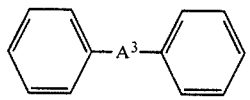
(1)-d wherein A³ represents —O—, —SO₂—, —CO—, or an alkylene group, and the phenyl rings may be substituted, and mononitro-benzenes or -naphthalenes.

Compounds of formula (1)-a in which at least one of A¹ and R¹ is an aromatic group which may be substituted, especially those in which A¹ is a divalent aromatic group which may be substituted, are preferred as the compounds of formula (1)-a.

Preferred compounds of formula (1)-b are those in which R² is a monovalent aliphatic group which may be substituted.

The imide compounds of formula (1)-a and (1)-b are especially preferred as the low-molecular weight compound (B) used in this invention.

In general formula (1)-a, examples of the divalent aromatic group for A¹ are 1,2-phenylene, 1,2-, 2,3- or 1,8-naphthylene, and 5,6,7,8-tetrahydro-1,2- or 2,3-naphthylene groups. Examples of the divalent aliphatic group are linear alkylene groups such as ethylene or trimethylene and cyclic alkylene groups such as 1,2-cyclohexylene, 1,2,3,4-tetrahydro-1,2- or 2,3-naphthylene. These groups may be substituted by substituents which are non-reactive with the aromatic polyesters. Examples of such substituents include lower alkyl groups such as methyl or ethyl, lower alkoxy groups such as methoxy and ethoxy, halogen atoms such as chlorine or bromine, and a cyclohexyl group which may be substituted by nitro, phenyl, phenoxy or methyl.

The aromatic group having a valence of n (n=1 or 2) which is represented by R¹ includes, for example, monovalent aromatic groups such as phenyl group, a naphthyl group, a 5,6,7,8-tetrahydro-1-, 2-, or 3-naphthyl groups, or a group of the formula

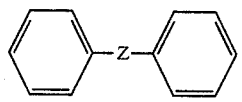

in which Z is —O—, —SO₂—, or —CH₂—, or divalent aromatic groups such as a 1,2-phenylene group, a 1,2-, 2,3- or 1,8-naphthylene group, a 5,6,7,8-tetrahydro-1,2-, or 2,3-naphthylene group, or a groups of the formula

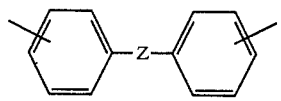

in which Z is —O—, —SO₂—, or —CH₂. Examples of the aliphatic group having a valence of n (n=1 or 2) include linear alkyl groups having 1 to 18 carbon atoms such as methyl, ethyl, butyl, hexyl, heptyl, octyl, nonyl, decyl, dodecyl, myristyl or stearyl, 5- or 6-membered cyclic alkyl groups such as cyclohexyl or cyclopentyl, linear alkylene groups having 2 to 12 carbon atoms such as ethylene, trimethylene, tetramethylene, hexamethylene, octamethylene, decamethylene or dodecamethylene, and a group of the formula

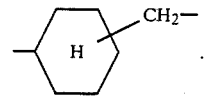

These groups represented by R¹ may have the same substituents as exemplified above with regard to A¹.

Preferred examples of the tetravalent aromatic group represented by A² in formula (1)-b are mononuclear, fused ring or polynuclear tetravalent aromatic groups represented, for example by the following formulae

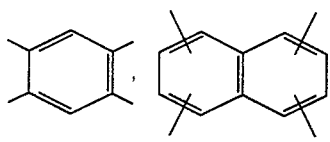

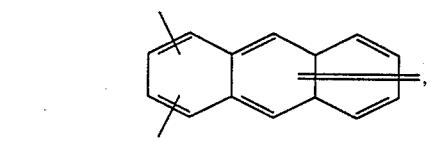

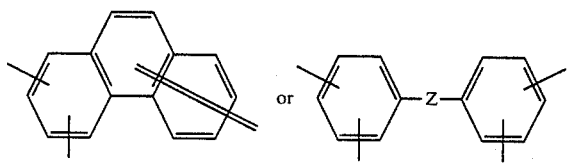

(Z is as defined above).

The same linear alkyl groups having 1 to 18 carbon atoms or 5- or 6-membered cyclic alkyl groups as exemplified with regard to R¹ in formula (1)-a may be cited as examples of the monovalent linear or cyclic aliphatic group for R².

The groups exemplified for A² and R² may be substituted by the same substituents as described above with regard to A¹.

Examples of the monovalent alkyl group for R³ in formula (1)-c are linear alkyl groups having 1 to 10 carbon atoms, such as methyl, ethyl, propyl, butyl, hexyl, octyl and decyl.

Examples of the alkylene groups for A³ in formula (1)-d include linear alkylene groups having 2 to 4 carbon atoms, such as ethylene, trimethylene and tetramethylene. The phenyl groups in formula (1)-d may be substituted by the same substituents exemplified hereinabove with regard to A¹.

Thus, examples of the imide compounds of formula (1)-a include those in which n is 1, such as N-methylphthalimide, N-ethylphthalimide, N-octylphthalimide, N-laurylphthalimide, N-myristylphthalimide, N-cetylphthalimide, N-stearylphthalimide, N-ethyl-1,8- naphthalimide, N-lauryl-1,8-naphthalimide, N-myristyl-1,8-naphthalimide, N-cetyl-1,8-naphthalimide, and N-stearyl-1,8-naphthalimide; and those in which n is 2, such as N,N'-ethylenebisphthalimide, N,N'-tetramethylenebisphthalimide, N,N'-hexamethylenebisphthalimide, N,N'-octamethylenebisphthalimide, N,N'-decamethylenebisphthalimide, N,N'-dodecamethylenebisphthalimide, N,N'-neopentylenebisphthalimide, N,N'-tetramethylenebis(1,8-naphthalimide), N,N'-hexamethylenebis(1,8-naphthalimide), N,N'-octamethylenebis(1,8-naphthalimide), N,N'-dodecamethylenebis(1,8-naphthalimide), N,N'-dodecamethylenebissuccinimide, N,N'-dodecamethylenebishexahydrophthalimide, N,N'-1,4-cyclohexylenebisphthalimide, 1-phthalimide-3-phthalimidomethyl-3,5,5-trimethylcyclohexane, N,N'-2,2,4-trimethylhexamethylenebisphthalimide, N,N'-2,4,4-trimethylhexamethylenebisphthalimide, 4,4'-bisphthalimidodiphenylether, 3,4'-bisphthalimidodiphenylether, 3,3'-bisphthalimidodiphenylsulfone, 4,4'-bisphthalimidodiphenylsulfone, and 4,4'-bisphthalimidodiphenylmethane.

Examples of the imide compounds of formula (1)-b include N,N'-diethylpyromellitimide, N,N'-dibutylpyromellitimide, N,N'-dihexylpyromellitimide, N,N'-dioctylpyromellitimide, N,N'-didecylpyromellitimide, N,N'-dilaurylpyromellitimide, N,N'-dicyclohexylpyromellitimide, and N,N'-diethyl-1,4,5,8-naphthalenetetracarboxylic acid 1,8- 4,5-diimide.

The imide compound of formula (1)-a can be produced by a known method from the corresponding acid anhydride and an organic amine.

Some of the imide compounds of formula (1)-a are known as dyeability improvers for modified polyesters (see Japanese Patent Publication No. 9677/1969), or a crystallization accelerator for polyethylene terephthalate injection-molding materials (see Japanese Laid-Open Patent Publication No. 84747/1981 and European Patent Application Publication No. 0029930).

Examples of the compounds of formula (1)-c are triethyl isocyanurate, tributyl isocyanurate, trihexyl isocyanurate and trioctyl isocyanurate.

Examples of the compounds of formula (1)-d are diphenyl ether, diphenylsulfone, benzophenone, diphenylmethane, 1,2-diphenylethane, and 1,4-diphenylbutane.

Examples of the mononitro-benzenes or mononitro-naphthalenes are nitrobenzene, nitrotoluene, and nitronaphthalene.

According to the process of this invention, an unstretched film-like or fibrous structure is formed by melt-shaping from a blend composed of the aromatic polyester (A) having a high degree of polymerization and the low-molecular-weight compound (B). The blend comprises 100 parts by weight of the aromatic polyester and 3 to 300 parts by weight, preferably 5 to 200 parts by weight, more preferably 10 to 150 parts by weight, of the low-molecular-weight compound (B).

The aromatic polyester blend can be produced by melt-mixing the aromatic copolyester (A) with the low-molecular-weight compound (B) in predetermined proportions (a first method); or by performing polycondensation reaction in the presence of the low-molecular-weight compound (B) to obtain a molten mass containing the aromatic polyester (A) and the low-molecular-weight compound (B) in predetermined proportions (a second method); or by reacting in the molten state the aromatic polyester with a polymerization promoter (chain-extender) capable of reacting with the terminal groups of the aromatic polyester under atmospheric or elevated pressure, in the presence of the low-molecular-weight compound (B) to obtain a molten mass containing the aromatic polyester (A) and the low-molecular-weight compound (B) in predetermined proportions (a third method).

According to the first method, the aromatic polyester (preferably dried fully) and the low-molecular-weight compound in predetermined proportions are preferably dry-blended before they are melt-blended in a melt extruder. If the amount of the low-molecular-weight compound is relatively large (for example, if it is used in an amount of more than about 50 parts by weight per 100 parts by weight of the aromatic polyester), a procedure is recommended which comprises subjecting the dry blend to a temperature at which the low-molecular-weight compound melts but the aromatic polyester does not, then cooling the mixture, pulverizing the mixture, and then feeding the pulverized mixture into a melt extruder where it is melted.

The practice of the second method is possible because the low-molecular-weight compound used in the process of this invention is substantially non-reactive with the aromatic polyester and has a relatively high boiling point (at least about 200° C. under atmospheric pressure). Accordingly, in the second method, the low-molecular-weight compound can be added to the polymerization system at any time during the polycondensation reaction. If, however, a low-molecular-weight compound (B) having a relatively low boiling point is used, it is liable to be removed out of the polymerization system. Hence, in employing the second method, the use of a low-molecular-weight compound (B) having a molecular weight of at least 440 is recommended. The greatest advantage of the second method is that since the low-molecular-weight compound gives a polymerization system having a lower melt viscosity than that of polymerization system without the low-molecular-weight compound, the glycol, etc. formed as a result of the polycondensation reaction can be easily removed from the reaction system and consequently, an aromatic polyester having a high degree of polymerization can be easily produced at a relatively low temperature. Thus, according to the second method, the resulting aromatic polyester contains a predetermined amount of the low-molecular-weight compound, and it can be directly used as the aromatic polyester blend in the process of this invention.

The third method has the advantage that the aromatic polyester blend used in this invention composed of the aromatic polyester (A) having a high molecular weight and the low-molecular-weight compound (B) can be produced during passage through a melt extruder by using an aromatic polyester, for example an aromatic polyester having a relatively low molecular weight which can be produced relatively easily by a melt-polymerization process.

Specifically, the third method is practiced by either
(a) a procedure of melt-reacting a carboxyl-terminated aromatic polyester preferably having an intrinsic viscosity of about 0.5 to about 0.6 with a bis-cyclic imino ether compound of the following formula

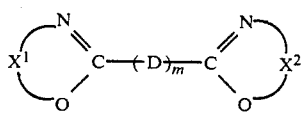 (2)

wherein $X^1$ and $X^2$ are identical or different, and each represents a divalent hydrocarbon group containing 2 or 3 ring-member carbon atoms forming the imino ether ring and being non-reactive under the reaction conditions; D represents a divalent hydrocarbon group non-reactive under the reaction conditions which may contain a hetero atom, or a group of the formula

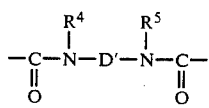

in which D' represents a divalent hydrocarbon group non-reactive under the reaction conditions which may contain a hetero atom, and $R^4$ and $R^5$ are identical or different and each represents a hydrogen atom or a monovalent hydrocarbon group, or $R^4$ and $R^5$ are bonded to each other to form a 5- or 6-membered ring together with the two nitrogen atoms and D'; and m is 0 or 1, in the presence of a low-molecular-weight compound which is substantially non-reactive with the aromatic polyester and the bis-cyclic imino ether compound and has a boiling point under atmospheric pressure of at least about 200° C. and a molecular weight of not more than 1,000; or (b) by melt-reacting a hydroxyl-terminated aromatic polyester preferably having an intrinsic viscosity of about 0.5 to about 0.6 with a bis-cyclic imino ester compound of formula (3)-a

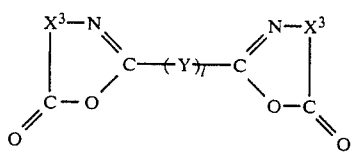 (3)-a wherein Y represent a divalent hydrocarbon group which may contain a hetero atom, $X^3$ represents a divalent hydrocarbon group containing 1 or 2 ring-member carbon atoms constituting the imino ester ring and being non-reactive under the reaction conditions, and l is 0 or 1, or formula (3)-b

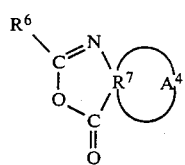 (3)-b wherein $A^4$ is a group represented by the following formula

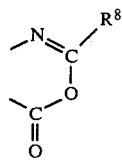 (h)

in which $R^8$ represents a monovalent hydrocarbon group, or a group of the following formula

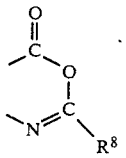 (i)

in which $R^8$ is as defined; $R^7$ represents a tetravalent aromatic group which may contain a hetero atom, and $R^6$ represents a monovalent hydrocarbon group which is identical with, or different from, $R^8$, in the presence of a low-molecular-weight compound substantially non-reactive with the aromatic polyester and the bis-cyclic imino ester compound and having a boiling point under atmospheric pressure of at least about 200° C. and a molecular weight of not more than 1,000.

The specification of the co-pending U.S. patent application Ser. No. 144036 and European Patent Application Publication No. 0020944 filed by the present inventors describes the bis-cyclic imino ether compound used in procedure (a) above, and discloses that this bis-cyclic imino ether compound reacts with the carboxyl-terminated aromatic polyester under the atmospheric to elevated pressure to give an aromatic polyester having a high molecular weight.

Likewise, U.S. Pat. No. 4,291,152 and European Patent Application Publication No. 0019061 filed by the present inventors describes the bis-cyclic imino ester compound used in procedure (b), and discloses that this bis-cyclic imino ester compound reacts with a hydroxyl-terminated aromatic polyester under the atmospheric to elevated pressure to give an aromatic polyester having a high molecular weight.

The aforesaid procedures (a) and (b) can be carried out in the same way as described in the above-cited prior specifications except that the melt-reaction is carried out in the presence of the low-molecular-weight compound (B). Accordingly, the disclosures of the above specifications are incorporated herein by reference.

The third method also has the advantage that an aromatic polyester having a high degree of polymerization can be easily produced at relatively low temperatures. It also gives the aromatic polyester blend used in this invention which contains the low-molecular-weight compound.

According to the process of this invention, the aromatic polyester blend prepared as above is first melt-shaped to convert it to an unstretched film-like or fibrous structure. The melt shaping can be carried out by using an apparatus known in the art under conditions well known in the art. The process of this invention has the excellent advantage that the melt shaping can be carried out at temperatures lower than those temperatures which are known for the molding of polymers having the same molecular weights as the aromatic polyesters used in the process of this invention. This advantage will become more apparent from working examples given hereinbelow.

The aromatic polyesters used in this invention which, for example, include polyethylene terephthalate having an intrinsic viscosity of 1.0 can be easily molded into a film-like or fibrous structure by the process of this invention at a temperature of about 270° C. to 290° C., although this temperature differs depending upon the type and amount of the low-molecular-weight compound (B) used.

Furthermore, as can be understood from the description of the methods for the production of the aromatic polyester blend described above, the molten aromatic polyester blends to be submitted to the melt shaping in the process of this invention can be the molten product itself obtained in each of the first to the third methods described above. For example, this means that there exists a melt-shaping slit or nozzle connected to the melt extruder used in the first or third method or to the polymerization reactor used in the second method.

As a result of the melt shaping in accordance with the process of this invention, an unstretched film-like structure having a thickness of not more than about 5 mm, or an unstretched fibrous structure having a diameter of not more than about 3 mm, both of which are suitable for the subsequent stretching and extraction, can be produced.

According to the process of this invention, the unstretched film-like or fibrous product is then stretched and, if desired, heat-set.

The stretching is carried out by a known method monoaxially (the fibrous or film-like structure), or biaxially (the film-like structure) ether simultaneously or sequentially.

Let the heat distortion temperature of the aromatic polyester blend be $T_g(°C.)$, then the stretching temperature ($T_1$, °C.) for the monoaxial stretching and the simultaneous biaxial stretching is given by the following equation.

$$T_g - 10 \leq T_1 \leq T_g + 30,$$

preferably $$T_g - 5 \leq T_1 \leq T_g + 20$$

In the case of the sequential biaxial stretching, the stretching temperature in the first stretching is the temperature $T_1$ given by the above equation, and the stretching temperature ($T_2$, °C.) in the second step is given by the following equation.

$$T_1 + 5 \leq T_2 \leq T_1 + 5,$$

preferably $$T_1 + 10 \leq T_2 \leq T_1 + 40$$

The stretch ratio is usually about 3 to 7 in the case of the fibrous structure, and about 3 to 30 in terms of area ratios in the case of the film-like structure.

Since the aromatic polyester blend used in the process of this invention contains the low-molecular-weight compound, the melt viscosity of the resulting aromatic polyester blend is lower than that of the aromatic polyester contained in the blend. Hence, a very thin fibrous structure or film-like structure can be produced even from the blend containing an aromatic polyester having a high molecular weight. For example, a stretched film-like structure having a thickness of about 1 micron or a stretched fibrous structure having a diameter of about 3 microns can be produced from a blend containing an aromatic polyester having an intrinsic viscosity of 1.0.

Investigations of the present inventors have shown that when it is desired to obtain a stretched film-like structure having a thickness of less than about 2 microns, it is desirable, from the standpoint of the stretching operation, to superimpose an unstretched film prepared from the aromatic polyester blend by the process of this invention, on an unstretched film, fully stretchable under the stretching conditions, prepared from an aromatic polyester, polypropylene, etc., and to stretch them together in the superimposed state. The stretched film assembly contains the two films in the superimposed and relatively firmly bonded state. But after it is subjected to the extracting step to be described, the constituent films easily separate from each other. Accordingly, a very thin aromatic polyester film can be easily obtained.

The resulting stretched film-like or fibrous structure, optionally after being heat-set, is subjected to extraction with an organic solvent.

The heat-setting is carried out under tension.

The heat-setting is carried out under tension. The heat-setting temperature ($T_s$, °C.) for the structure obtained by monoaxial stretching or simultaneous biaxial stretching is given by the following equation $$T_1 + 5 \leq T_s \leq T_m - 10$$

wherein $T_1$ is the stretching temperature and $T_m$ is the melting point of the aromatic polyester blend. In the case of the sequential biaxial stretching, the heat-setting temperature $T_s$ is given by the following equation $$T_2 + 5 \leq T_s \leq T_m - 10$$

wherein $T_2$ is the temperature of the second stretching and $T_m$ is as defined. The heat setting can be carried out usually for a period of 1 second to 10 minutes.

The extraction is carried out by using an organic solvent which does not substantially dissolve the aromatic polyester under the extracting conditions, preferably an organic solvent which in addition to meeting the above requirement, is liquid at ambient temperature and has a boiling point of less than about 200° C. under atmospheric pressure.

The organic solvent preferably includes aromatic hydrocarbons having 6 to 9 carbon atoms, halogenated hydrocarbons having 1 or 2 carbon atoms, aliphatic ketones having 3 to 6 carbon atoms, aliphatic esters having 3 to 6 carbon atoms, 5- or 6-membered cyclic ethers, and aliphatic alcohols having 1 to 3 carbon atoms.

Specific examples of the organic solvent include aromatic hydrocarbons having 6 to 9 carbon atoms such as benzene, toluene, ethylbenzene, xylene, cumene and pseudocumene; halogenated aliphatic hydrocarbons having 1 or 2 carbon atoms such as methylene chloride, chloroform, and dichloromethane; aliphatic ketones having 3 to 6 carbon atoms such as acetone, methyl ethyl ketone and methyl isobutyl ketone; aliphatic esters having 3 to 6 carbon atoms such as methyl acetate, ethyl acetate, propyl acetate, methyl propionate, ethyl propionate and propyl propionate; 5- or 6-membered cyclic ethers such as tetrahydrofuran and dioxane; and aliphatic alcohols having 1 to 3 carbon atoms such as methanol, ethanol and propanol.

Of these, aromatic hydrocarbons having 6 to 9 carbon atoms, halogenated hydrocarbons having 1 or 2 carbon atoms, and 5- or 6-membered cyclic ethers are especially preferred.

The extraction with the organic solvent is advantageously carried out on a film-like structure having a thickness of not more than about 1 mm, preferably about 1 micron to about 500 microns or a fibrous structure having a diameter of not more than about 1 mm, preferably about 3 to about 400 microns.

Preferably, the extraction is carried out under tension, and can be carried out at a temperature between ambient temperature and the boiling point of the organic solvent used. The optimal extracting time required for the extraction varies depending upon the organic solvent used, the thickness of the film-like structure to be submitted to the extraction, the diameter of the fibrous structure to be submitted to the extraction, the amount of the low-molecular-weight compound contained in the film-like or fibrous structure, the extracting temperature, etc. Generally, the optimal time required for the extraction becomes shorter as the thickness of the film-like structure becomes smaller, the diameter of the fibrous structure becomes smaller, and the extracting temperature becomes higher.

In most cases, the extraction can be terminated in several seconds to about 1 hour. Thus, there can be obtained a film-like structure or fibrous structure from which at least about 70% by weight, preferably at least about 80% by weight, above all at least about 90% by weight, of the low-molecular-weight compound contained in it has been extracted out.

The extraction can be carried out by passing the running film-like or fibrous structure through the organic solvent, or by dipping the stationary film-like or fibrous structure in the organic solvent. In either case, the organic solvent may be flowing or stationary. Desirably, at least one of the film-like or fibrous structure and the organic solvent is running or flowing. The amount of the organic solvent used for the extraction should of course be sufficient to dissolve all of the low-molecular-weight compound to be extracted. Usually, it is at least about 10 times, preferably at least about 15 times, the weight of the film-like or fibrous structure.

As required, the film-like or fibrous structure extracted is then dried or heat-set. The heat-setting can be carried out under the same conditions as described hereinabove. The heat-setting may be carried out such that it also serves as a drying operation.

Thus, according to the process of this invention, there can be provided a film-like or fibrous structure of an aromatic polyester which does not substantially contain the low-molecular-weight compound or which contains it in an amount of at most 1 part by weight per 100 parts by weight of the aromatic polyester.

In spite of the fact that the film-like or fibrous structure obtained by the process of this invention has undergone the extracting treatment as stated above, it is surprising that it does not contain pores which open to both surfaces. This is true even with regard to the product obtained from the aromatic polyester blend containing a very large amount of the low-molecular-weight compound. This is substantiated by the fact that the film-like structure obtained by the process of this invention has a gas and a water permeability which are little different from those of a film-like structure obtained from the corresponding aromatic polyester alone (see working examples given hereinabove).

Investigations of the present inventors have shown that the thickness ($d_1$, $\mu$) of the film-like structure obtained by the process of this invention can be substantially calculated in accordance with the following equation.

$$d_1 = d_2(100 - \alpha \cdot x)/100$$

wherein $d_2$ is the thickness in microns of the film-like structure before the extraction, and x is the content in weight percent of the low-molecular-weight compound in the aromatic polyester blend, and $\alpha$ is the ratio of extraction defined by the following equation $$\alpha = \frac{\text{Amount of the low-molecular-weight compound extracted}}{\text{Amount of the low-molecular-weight compound before extraction}}$$

which is usually about 0.7 to about 1, and in many cases about 0.9 to about 1.

It is seen from the above equation that a film-like structure having a thickness of about 3.2 microns and containing the low-molecular-weight compound in an amount of 1% by weight ($\alpha = 0.99$) can be produced by extraction from a film-like structure (before extraction) having a thickness of 6.4 microns and containing 50% by weight of the low-molecular-weight compound.

The film-like or fibrous structure obtained by the process of this invention has very low oligomer content. Presumably, this fact, in conjunction with the fact that the film-like or fibrous structure is made up of the aromatic polyester having a high molecular weight, contributes to a further improvement in the properties of the resulting structure.

The film-like or fibrous structure obtained by the process of this invention has various superior properties to a film-like or fibrous structure obtained by a conventional method from the corresponding aromatic polyester having a high degree of polymerization alone, such as superior mechanical properties (e.g. strength and elongation) or superior wet heat resistance, it can be used very suitably in various fields which require such properties, for example as various industrial materials such as rubber-reinforming materials, magnetic tapes, and insulating films.

The following examples illustrate the process of this invention in greater detail. All parts in these examples are by weight.

The various properties shown in the present application were measured by the following methods.

(1) Intrinsic viscosity ([$\eta$])

Measured at 35° C. in an o-chlorophenol solution in a concentration of 1.2 g/dl.

(2) Terminal carboxyl group content ([—COOH]) and terminal hydroxyl group content ([—OH])

Measured in accordance with the method of A. Conix [Maxromol. Chem. 26, 226 (1958)].

(3) Heat-distortion temperature ($T_g$) of the aromatic polyester blend.

An amorphous test film having a thickness of 500 microns, a width of 1 cm and a length of about 6 cm was prepared by melt shaping, and placed on a support stand having two fulcra apart from each other by a distance of 3 cm (each fulcrum having a width of 2 cm). A weight (10 g) was placed on the test film substantially midway between the two fulcra. The entire assembly was then submerged in a water bath. Then, the temperature of the water bath was raised at a rate of about 4° C./min. The temperature at which the central part of the test film having the weight placed thereon descended 1 cm from the upper end of the fulcra was measured, and defined as the heat distortion temperature.

(4) Melting point ($T_m$) of the aromatic polyester blend

Measured at a temperature raising rate of 10° C./min. by means of a micro melting point measuring device.

On the other hand, a differential thermal chart was determined at a temperature raising rate of 10° C./min. by using a differential thermal analyzing device (DSC).

That endothermic peak in the differential thermal chart which was closest to the melting point measured by the micro melting point measuring device was defined as the melting point ($T_m$) of the aromatic polyester blend.

(5) Percent extraction (%) of the low-molecular-weight compound

Calculated as an approximate value from the difference in weight of the sample before and after the extraction.

(6) Oligomer content (%)

Measured by gel permeation chromatography (GPC). Crosslinked polystyrene (G2000H8, G3000H8, G4000H8, G5000H6, products of Toyo Soda Mfg. Co., Ltd.) was used as a gel. The sample was dissolved in hexafluoroisopropanol, and chloroform was used as a developing solvent. The measurement was carried out at 40° C.

(7) Strength, elongation and Young's modulus

Measured by means of an Instron tester as a pulling speed of 100% /min.

(8) Gas permeability of the film

A gas permeability measuring device (model K-315 manufactured by Rika Seiki Kogyo Kabushiki Kaisha) including a U-shaped manometer was used. A sample film was mounted on the device, and then the following procedure was taken. (1) Vacuum cocks were opened to provide a high vacuum on both sides of the sample film (first on a low-pressure side and then on a high-pressure side). After which the cock on the low-pressure side alone was closed, and a blank test was conducted. (2) Thereafter, a measuring gas was introduced into the high-pressure side of the film, and the gas permeation of the film was measured. The measurement was performed by recording a displacement in the manometer on a photoelectric self-recording recorder.

The gas permeability (P) of the film was calculated from the following equation.

$$P = V \times \frac{273}{1} \times \frac{1}{760} \times \frac{10000}{A} \times \frac{1}{\Delta P} \times \frac{dh}{dt} \times l$$

wherein
V: the volume (cc) on the low-pressure side
$\Delta P$: the difference in pressure (cmHg)
A: the area of the film (cm$^2$)
dh/dt: the gradient of gas flow in a steady state (mmHg/sec)
l: the thickness of the film (cm)
T: the measuring temperature (°C.)

(9) Water permeability of the film

Phosphorus pentoxide (15 g) was put in a cylindrical glass bottle having a height of about 6 cm and including a mouth portion with a cross-sectional area of about 4 cm$^2$. The mouth portion was sealed up with a sample film, and the bottle was allowed to stand in an atmosphere kept at a temperature of about 15° C. and a relative humidity of about 50%. The water permeability of the sample film was calculated from its weight increase caused by the water absorption of phosphorus pentoxide.

(10) Thickness of the film

Measured by using an electronic micrometer (K-351, a device made by Anritsu Co., Ltd.).

EXAMPLES 1 TO 4 AND COMPARATIVE EXAMPLES 1 AND 2

Polyethylene terephthalate chips having an intrinsic viscosity of 1.03 were dried, and then 100 parts of the dried polyester chips were dry-blended with a predetermined amount of each of the imide compounds shown in Table 1. The mixture was melted at about 280° C. by means of a twin-screw extruder, and extruded through a T-die to form an unstretched film having a thickness of about 200 microns. The unstretched film was stretched simultaneously in the longitudinal and transverse directions at a stretch ratio of 3.8 at each of the stretching temperatures shown in Table 1. The film was then extracted with each of the organic solvents indicated in Table 1 at constant length for 10 minutes at the refluxing temperature of the organic solvent. The treated film was dried at 150° C. for 15 minutes and then heat-treated at 220° C. for 2 minutes to give a stretched film. The properties of the stretched film are shown in Table 1.

For comparison, the above procedure of film formation was followed under the same conditions as above except that the imide compound was not added. The molten polyester could not be extruded from the T-die because of its high viscosity. (Comparative Example 1)

When the film formation in Comparative Example 1 was carried out at a temperature of 320° C., the intrinsic viscosity of the resulting unstretched film was 0.77. The unstretched film was biaxially stretched under the same conditions as in Example 1, and the results are shown in Table 1. (Comparative Example 2)

TABLE 1

| Example | Imide compound and its amount (parts) | Stretching temperature (°C.) | Organic solvent | Percent extraction of the imide compound (%) | Properties of the stretched film | | |
|---|---|---|---|---|---|---|---|
| | | | | | Intrinsic viscosity | Strength (kg/mm$^2$) | Elongation (%) |
| 1 | N,N'—decamethylene-bisphthalimide (25) | 70 | Chloroform | 99.2 | 0.96 | 27.6 | 118 |
| 2 | N,N'—dodecamethylenebis- | 55 | Xylene | 99.0 | 0.95 | 28.7 | 113 |

TABLE 1-continued

| Example | Imide compound and its amount (parts) | Stretching temperature (°C.) | Organic solvent | Percent extraction of the imide compound (%) | Properties of the stretched film | | |
|---|---|---|---|---|---|---|---|
| | | | | | Intrinsic viscosity | Strength (kg/mm$^2$) | Elongation (%) |
| 3 | phthalimide (30) 3,4'—bisphthalimidediphenyl ether (40) | 90 | Dioxane | 98.8 | 0.95 | 28.9 | 109 |
| 4 | N,N'—didecylpyromellitimide (40) | 80 | Xylene | 98.6 | 0.94 | 27.9 | 105 |
| Comparative Example 2 | None | 90 | None | — | 0.77 | 25.8 | 135 |

The film obtained in Example 2 was subjected to gel-permeation chromatography. The oligomer content of the film was determined from the peak area ratio of the gel-permeation chromatogram. It was found to be 0.1% by weight.

The biaxially stretched film obtained in Comparative Example 2 was subjected to extracting treatment under the same conditions as in Example 2, and its oligomer content was determined. It was found to be 1.2% by weight.

EXAMPLES 5, 6 and 7 and Comparative Example 3

One hundred parts of polyethylene terephthalate chips ([$\eta$]=0.86; [—COOH]=36 eq./10$^6$ g) were dried and then dry-blended with 0.3 part of 2,2'-bis(2-oxazoline) as a chain extender and a predetermined amount of each of the imide compounds shown in Table 2. The dry blend was melted at about 280° C. in a twin-screw extruder, and extruded through a T-die to form an unstretched film having a thickness of about 100 microns.

The unstretched film was then simultaneously stretched in the longitudinal and transverse directions at a ratio of 3.6 at each of the temperatures shown in Table 2, and then dipped at constant length for 15 minutes in xylene under refluxing conditions. The film was then dried at 150° C. for 15 minutes, and heat-treated at constant length at 230° C. for 2 minutes. The properties of the stretched film are shown in Table 2.

Table 2 also gives the results of Comparative Example 3 in which the film formation was carried out as above by using polyethylene terephthalate having an [$\eta$] of 0.68 alone without the imide compound and the chain extender.

TABLE 2

| Example | Imide compound and its amount (parts) | Stretching temperature (°C.) | Percent extraction of the imide compound (%) | Properties of the stretched film | | | | |
|---|---|---|---|---|---|---|---|---|
| | | | | Intrinsic viscosity | Strength (kg/mm$^2$) | Elongation (%) | Thickness ($\mu$) | Water permeability (mg · $\mu$/cm$^2$ · hr) |
| 5 | dodecamethylenebis-1,8-napthalimide (60) | 60 | 99.6 | 1.26 | 26.9 | 109 | 4.5 | 0.43 |
| 6 | 1-phthalimide-3-phthalimidomethyl-3,5,5-trimethyl-cyclohexane (50) | 85 | 99.8 | 1.23 | 27.3 | 112 | 5.0 | 0.44 |
| 7 | N,N'—dioctylpromellitimide (40) | 80 | 98.9 | 1.18 | 28.6 | 102 | 5.5 | 0.44 |
| Comparative Example 3 | None | 90 | — | 0.65 | 25.9 | 118 | 12.0 | 0.45 |

EXAMPLE 8

One hundred parts of polyethylene terephthalate having an intrinsic viscosity of 0.86 was dry-blended with 40 parts of 1-phthalimide-3-phthalimidomethyl-3,5,5-trimethylolcyclohexane and the dry blend was then melted at 260° C. by using an extruder. The molten mixture was extruded through a spinneret having an orifice diameter of 0.5 mm to form filaments. The filaments were stretched to 6.0 times at 80° C., heat-treated at 160° C. at 5% stretch, and then dipped for 30 seconds in chloroform under the refluxing conditions. As a result of the extracting treatment in chloroform, 96% of the 1-phthalimide-3-phthalimidomethyl-3,5,5-trimethyl-cyclohexane was removed.

The resulting stretched filaments had an intrinsic viscosity of 0.80, a tenacity of 8.1 g/de, an elongation of 12.7%, and a Young's modulus of 174 g/de.

EXAMPLE 9

One hundred parts of polyethylene terephthalate having an intrinsic viscosity of 0.90 and 15 parts of diphenylsulfone were dry-blended, and then melted at 285° C. by using an extruder. The molten mixture was extruded through a spinneret having an orifice diameter of 0.5 mm to form filaments. The resulting unstretched filaments were stretched to 5.5 times at 60° C., and then dipped for about 1 minute in chloroform under reflux. The filaments were then dried at 100° C. for about 10 minutes, and stretched to 1.1 times at 160° C. The resulting filaments had an intrinsic viscosity of 0.86, a tenacity of 8.3 g/de and an elongation of 12%.

EXAMPLE 10

One hundred parts of polyethylene terephthalate chips having an intrinsic viscosity of 0.90 was dry-blended with 30 parts of alpha-nitronaphthalene, and then melted at 260° C. by an extruder. Then, the molten mixture was extruded through a spinneret having an orifice diameter of 0.5 mm. The molten mixture had a melt viscosity of about 1,000 poises.

The unstretched filaments were stretched to 5.0 times at 50° C., dipped for about 1 minute in chloroform under reflux, dried at 100° C. for about 10 minutes, and then stretched further to 1.1 times at 160° C. The resulting stretched filaments had an intrinsic viscosity of 0.85, a tenacity of 8.6 g/de and an elongation of 10.6%.

EXAMPLES 11 TO 14 AND COMPARATIVE EXAMPLE 4

(1) A reactor was charged with 194 pars of dimethyl terephthalate, 128 parts of ethylene glycol and 0.06 part of calcium acetate, and they were subjected to ester-interchange reaction at a temperature of 150° to 220° C. with stirring until the degree of ester interchange reached 95%. Then, 0.06 part of trimethyl phosphate, 0.10 part of antimony trioxide and a predetermined amount of each of the imide compounds shown in Table 3 were added. The temperature was raised to 280° C., and the reaction was carried out in a stream of nitrogen under atmospheric pressure for 20 minutes. Then, the polycondensation was carried out under a low vacuum of about 20 mmHg for 15 minutes and then under a high vacuum of about 0.5 mmHg for about 5 hours.

Table 3 shows the melt viscosity of the polymer determined from the torque required during the stirring, the intrinsic viscosity of the polymer which was converted into chips and dipped for 2 hours in xylene under reflux to extract the imide compound, and the melting points of the polymer before and after the extraction.

For comparison, the results obtained in Comparative Example 4 in which the above procedure was repeated without using the imide compound are also shown in Table 3.

TABLE 3

| Example | Imide compound and its amount (parts) | Melt viscosity (× 10³ poises) | [η] after extraction | Melting point (°C.) before extraction | Melting point (°C.) after extraction |
|---|---|---|---|---|---|
| 11 | N,N'—dodeca-methylenebis-phthalimide (125) | about 2.5 | 1.12 | 245 | 259 |
| 12 | N,N'—dodeca-methylenebis-phthalimide (90) | about 10 | 1.28 | 248 | 259 |
| 13 | N,N'—dodeca-methylenebis-1,8-naphthal-imide (75) | about 12 | 1.26 | 252 | 260 |
| 14 | N—stearyl-1,8-naphthal-imide (75) | about 12 | 1.25 | 250 | 260 |
| Comparative Example 4 | None | >15 | 0.95* | 260 | — |

*The stirring failed after the lapse of about 2 hours under a high vacuum, and thereafter, the reaction was carried out without stirring.

The above results demonstrate that when the polymerization is carried out in the presence of an imide compound in the polymerization reaction system, the melt viscosity of the polymerization system is lower than in the case of an ordinary method (Comparative Example 4), and a polyester having a high degree of polymerization not ordinarily obtainable can be formed, and that the imide compound can be easily removed by the extracting treatment.

(2) Polyethylene terephthalate chips containing the imide compound obtained in each of Examples 11 to 14 were dried at 120° C. for about 10 hours, and then melt-extruded from a T-die of an extruder at each of the temperatures shown in Table 4 to form an unstretched film having a thickness of about 200 microns. The unstretched film was stretched simultaneously to 3.8 times both in the longitudinal and transverse directions at each of the stretching temperatures shown in Table 4. The stretched film was heat-treated at constant length at 180° C. for 2 minutes, and then dipped for about 5 minutes in xylene under reflux. The dipped film was dried at 150° C. for about 10 minutes, and heat-treated at 220° C. for 2 minutes. The properties of the film are shown in Table 4.

TABLE 4

| Example | Extruding temperature (°C.) | Stretching temperature (°C.) | Properties of the stretched film Strength (kg/mm²) | Properties of the stretched film Elongation (%) | Percent extraction of the imide compound (%) |
|---|---|---|---|---|---|
| 11 | 280 | 40 | 28.2 | 103 | 99.6 |
| 12 | 285 | 55 | 29.5 | 100 | 99.5 |
| 13 | 290 | 70 | 29.2 | 92 | 99.3 |
| 14 | 290 | 40 | 28.6 | 98 | 99.3 |

EXAMPLES 15 TO 18

One hundred parts of polyethylene terephthalate chips having an intrinsic viscosity of 1.15 were dry-blended with a predetermined amount of each of the imide compounds shown in Table 5. The blend was melted and extruded through a T-die of an extruder at a polymer temperature of about 275° C. with an average residence time of about 10 minutes to form an unstretched film having a thickness of about 30 microns. The unstretched film was then simultaneously stretched biaxially to 3.5 times in each direction at 90° C. to form a stretched film having a thickness of about 2.4 microns. The stretched film was dippped at constant length in xylene for 5 minutes to extract the imide compound, and dried and heat-treated at 180° C. for 10 minutes. The percent extraction of the imide compound and the properties of the stretched film are shown in Table 5.

TABLE 5

| Example | Imide compound and its amount (parts) | Percent extraction of the imide compound (%) | Properties of the stretched film ||||| 
|---|---|---|---|---|---|---|---|
| | | | Intrinsic viscosity | Thickness ($\mu$) | Strength (kg/mm$^2$) | Elongation (%) | Young's modulus (kg/mm$^2$) |
| 15 | 1-phthalimide-3-phthalimidomethyl-3,5,5-trimethyl-cyclohexane (80) | 99.2 | 0.93 | 1.3 | 29.8 | 104 | 480 |
| 16 | 1-phthalimide-3-phthalimidomethyl-3,5,5-trimethyl-cyclohexane (120) | 99.5 | 0.89 | 1.1 | 27.6 | 95 | 435 |
| 17 | 3,4'-bisphthalimide diphenyl ether (100) | 98.6 | 0.91 | 1.2 | 28.5 | 96 | 465 |
| 18 | N,N'—dodecamethyl-enebis(1,8-naphthal-imide) (50) | 99.5 | 0.91 | 1.6 | 29.2 | 92 | 470 |

EXAMPLE 19

110 Parts of 1-phthalimide-3-phthalimidomethyl-3,5,5-trimethylcyclohexane (melting point 213° C.) was melted at 240° C. in a stream of nitrogen, and well mixed with polyethylene terephthalate chips ($[\eta]=1.15$; $[-COOH]=11$ eq./$10^6$ g) heated at 150° C. The mixture was then maintained at 150° C. for 1 hour the solidify the imide compound, and then pulverized to form polyethylene terephthalate chips having the imide compound adhering to their surface. The chips were dried at 150° C. for 16 hours. One hundred parts of the chips were mixed with 0.15 part of 2,2'-bis(2-oxazoline) and 0.25 part of 2,2'-bis(3,1-benzoxadin-4-one) as chain extenders. The mixture was extruded through a T-die of a twin-screw extruder at a polymer temperature of 275° C. with an average residence time of about 8 minutes to form an unstretched film having an intrinsic viscosity of 1.03 and a thickness of about 25 microns. The film was then stretched biaxially at the same time to 3.8 times in each direction at 90° C. to form a stretched film having a thickness of 1.7 microns. The stretched film was then heat-treated at constant length at 180° C. for 2 minutes, and subsequently treated for 1 minute in xylene under reflux to extract 99.4% of the imide compound. The film was dried at 150° C. for 10 minutes. The stretched film had a thickness of 0.8 micron, a strength of 28.7 kg/mm$^2$, an elongation of 80%, and a Young's a modulus of 510 kg/mm$^2$. By GPC, no oligomer could be detected from the stretched film.

EXAMPLES 20 TO 23 AND COMPARATIVE EXAMPLE 5

One hundred parts of polyethylene terephthalate having an intrinsic viscosity of 0.93 and a terminal hydroxyl group content of 40 eq./$10^6$ g was dry-blended with 0.7 part of 2,2'-bis(3,1-benzoxadin-4-one) and a predetermined amount of each of the low-molecular-weight compounds shown in Table 6. The blend was then melt-extruded through a T-die of a twin-screw extruder at a polymer temperature of 280° C. with an average residence time of about 7 minutes to form an unstretched film having a thickness of about 100 microns. The film was stretched simultaneously in the longitudinal and transverse directions to 3.6 times respectively at each of the temperatures shown in Table 6, heat-treated at constant length at 210° C. for 2 minutes, treated in toluene under reflux for 5 minutes, and then dried at 150° C. for 15 minutes. The properties of the resulting stretched film are shown in Table 6.

TABLE 6

| Example | Low-molecular-weight compound and its amount (parts) | Stretching temperature (°C.) | Properties of the stretched film |||||| 
|---|---|---|---|---|---|---|---|---|
| | | | Intrinsic viscosity | Thickness ($\mu$) | Strength (kg/mm$^2$) | Elongation (%) | Gas permeability ($\times 10^{-12}$, cc · cm/cm$^2$ · sec · cmHg) ||
| | | | | | | | O$_2$ | N$_2$ |
| 20 | N,N'—dodecamethyl-enebisphthalimide (25) | 70 | 1.21 | 6.2 | 29.8 | 103 | 2.76 | 0.39 |
| 21 | N,N'—dioctylpyro-mellitimide (30) | 80 | 1.18 | 6.0 | 29.2 | 96 | 2.95 | 0.37 |
| 22 | 1-phthalimide-3-phthalimidomethyl-3,5,5-trimethyl-cyclohexane (100) | 90 | 1.19 | 3.9 | 28.5 | 112 | 2.88 | 0.44 |
| 23 | tribytyl isocyanurate (12) | 65 | 1.15 | 6.8 | 27.1 | 108 | 2.91 | 0.43 |
| Comparative Example 5 (*) | None | — | — | — | — | — | 2.93 | 0.43 |

(*): The same film as in Comparative Example 3 was used.

EXAMPLES 24, 25 AND 26 AND COMPARATIVE EXAMPLE 6

One hundred parts of polytetramethylene terephthalate chips having an intrinsic viscosity of 1.08 and a terminal carboxyl group content of 37 eq./$10^6$ g were dry-blended with a predetermined amount of each of the low-molecular-weight compounds shown in Table 7 and 0.5 part of 2,2′-bis(2-oxazoline), and melt-extruded through a T-die of an extruder at a temperature of 245° C. with an average residence time of about 5 minutes to form an unstretched transparent film having a thickness of about 50 microns. The film was stretched at 70° C. to 3.0 times in each of the longitudinal and transverse directions, and then heat-treated at constant length at 180° C. for 1 minute, dipped in xylene under reflux for 5 minutes, and dried at 150° C. for 10 minutes. The properties of the resulting stretched film are shown in Table 7.

When the above procedure of film formation was followed without using the low-molecular-weight compound, the melt viscosity of the molten mixture was so high that a film could not be prepared from it. (Comparative Example 6).

nent and an aliphatic diol and/or an alicyclic diol as a main glycol component and (B) 3 to 300 parts by weight of a low-molecular-weight compound being substantially non-reactive with the aromatic polyester (A) and having a boiling point of at least about 200° C. under atmospheric pressure and a molecular weight of not more than 1,000 and being a compound selected from the group consisting of imide compounds of the formula (1)-a

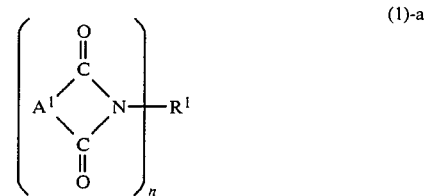

(1)-a

TABLE 7

| Example | Low-molecular-weight compound and its amount (parts) | Percent extraction of the low-molecular weight compound (%) | Properties of the stretched film ||||
|---|---|---|---|---|---|---|
| | | | Intrinsic viscosity | Thickness (μ) | Strength (kg/mm²) | Elongation (%) |
| 24 | 1-phthalimide-5-phthal-imidomethyl-3,5,5-methylcyclohexane (100) | 99.1 | 1.29 | 2.9 | 18.8 | 83 |
| 25 | 3,4′-bisphthalimide diphenyl ether (80) | 99.6 | 1.34 | 3.3 | 19.9 | 69 |
| 26 | N,N′—decamethylene-bis-1,8-naphthalimide (60) | 98.3 | 1.33 | 3.5 | 18.2 | 66 |

EXAMPLES 27 TO 29

The procedure of Example 1 was followed except that the imide compound, the stretching temperature and the organic solvent were changed as shown in Table 8. The properties of the resulting stretched films are also shown in Table 8.

wherein $A^1$ represents a divalent aromatic group or linear or cyclic aliphatic group which may be substituted $R^1$ represents an aromatic group or linear or cyclic aliphatic group having a valence of n; n is 1 or 2; and the imide ring is 5- or 6-membered, imide compounds of the following formula (1)-b

TABLE 8

| Example | Imide compound and its amount (parts) | Stretching temperature (°C.) | Organic solvent | Percent extraction of the imide compound (%) | Properties of the stretched film |||
|---|---|---|---|---|---|---|---|
| | | | | | Intrinsic viscosity | Strength (kg/mm²) | Elongation (%) |
| 27 | N,N′—octamethylene-bis(4-methylphthal-imide) (30) | 60 | Toluene | 99.0 | 0.93 | 28.8 | 105 |
| 28 | N,N′—dodecamethylene-bis(tetrachlorophthal-imide) (20) | 80 | Xylene | 98.5 | 0.96 | 29.3 | 98 |
| 29 | N,N′—decamethylene-bis(3-methylphthal-imide) (25) | 65 | Xylene | 99.0 | 0.94 | 28.3 | 111 |

What we claim is:

1. A process for producing a film-like or fibrous structure of an aromatic polyester which does not contain pores which open to both surfaces, which comprises (1) forming an unstretched film-like or fibrous structure by melt-shaping a blend comprising 100 parts by weight of (A) an aromatic polyester having a high degree of polymerization and containing an aromatic dicarboxylic acid as a main acid compo-

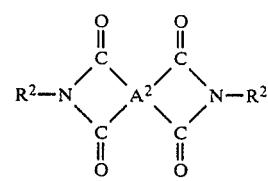

(1)-b wherein $A^2$ represents a tetravalent aromatic group which may be substituted, $R^2$ represents a monovalent linear or cyclic aliphatic group which may be substituted, and the imide rings are 5- or 6-membered, trialkylisocyanurates of the formula (1)-c

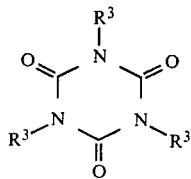
(1)-c wherein $R^3$ represents a monovalent alkyl group, diphenyl compounds of the formula (1)-d

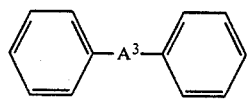
(1)-d wherein $A^3$ represents —O—, —SO$_2$—, —CO—, or an alkylene group, and the phenyl rings may be substituted, nitrobenzene, nitrotoluene, and nitronaphthalene, (2) stretching the resulting film-like or fibrous structure, the stretching ratio being from about 3 to about 7 in the case of the fibrous structure and from about 3 to about 30 in terms of area ratio in the case of the film-like structure, and (3) extracting at least a major portion of the low-molecular-weight compound from the stretched film-like or fibrous structure by using an organic solvent which does not substantially dissolve the aromatic polyester under the extracting conditions.

2. The process of claim 1 wherein the aromatic polyester (A) has an intrinsic viscosity, measured at 35° C. in an o-chlorophenol solution, of at least about 0.6.

3. The process of claim 1 wherein the low-molecular-weight compound has a melting point of at least about 100° C.

4. The process of claim 1 wherein the amount of the low-molecular-weight compound is 5 to 200 parts by weight per 100 parts by weight of the aromatic polyester.

5. The process of claim 1 wherein the amount of the low-molecular-weight compound is 10 to 150 parts by weight per 100 parts by weight of the aromatic polyester.

6. The process of claim 1 for producing a film-like structure wherein the thickness of the stretched film-like structure to be submitted to the extracting step is not more than about 1 mm.

7. The process of claim 1 for producing a fiber-like structure wherein the diameter of the stretched fibrous structure to be submitted to the extracting step is not more than about 1 mm.

8. The process of claim 1 wherein the organic solvent used in the extraction is liquid at ambient temperature and has a boiling point of less than about 200° C. under atmospheric pressure.

9. The process of claim 1 or 8 wherein the organic solvent is an aromatic hydrocarbon having 6 to 9 carbon atoms, a halogenated aliphatic hydrocarbon having 1 to 2 carbon atoms, an aliphatic ketone having 3 to 6 carbon atoms, an aliphatic ester having 3 to 6 carbon atoms, a 5- or 6-membered cyclic ether, or an aliphatic alcohol having 1 to 3 carbon atoms.

10. The process of claim 1 wherein the extraction is carried out at a temperature between ambient temperature and the boiling point of the organic solvent used.

11. The process of claim 1 wherein the extraction is carried out under tension.

12. The process of claim 1 wherein the aromatic polyester contains terephthalic acid as a main acid component and a polymethylene glycol having 2 to 6 carbon atoms as a main glycol component.

13. The process of claim 1 wherein the low-molecular-weight compound is triethyl isocyanurate, tributyl isocyanurate, trihexyl isocyanurate or trioctyl isocyanurate.

14. The process of claim 1 wherein the low molecular-weight compound is diphenyl ether, diphenyl sulfone, benzophenone, diphenylmethane, 1,2-diphenylethane or 1,4-diphenylbutane.

15. The process of claim 1 wherein the low-molecular-weight compound is selected from the group consisting of N-methylphthalimide, N-ethylphthalimide, N-octylphthalimide, N-laurylphthalimide, N-myristylphthalimide, N-cetylphthalimide, N-stearylphthalimide, N-ethyl-1,8-naphthalimide, N-lauryl-1,8-naphthalimide, N-myrystyl-1,8-naphthalimide, N-cetyl-1,8-naphthalimide, N-stearyl-1,8-naphthalimide, N,N'-ethylenebisphthalimide, N,N'-tetramethylenebisphthalimide, N,N'-hexamethylenebisphthalimide, N,N'-octamethylenebisphthalimide, N,N'-decamethylenebisphthalimide, N,N'-dodecamethylenebisphthalimide, N,N'-neopentylenebisphthalimide, N,N'-tetramethylenebis(1,8-naphthalimide), N,N'-hexamethylenebis(1,8-naphthalimide), N,N'-octamethylenebis(1,8-naphthalimide), N,N'-dodecamethylenebis(1,8-naphthalimide), N,N'-dodecamethylenebissuccinimide, N,N'-dodecamethylenebishexahydrophthalimide, N,N'-1,4-cyclohexylenebisphthalimide, 1-phthalimide-2-phthalimidomethyl-3,5,5-trimethylcyclohexane, N,N'-2,2,4-trimethylhexamethylenebisphthalimide, N,N'-2,4,4-trimethylhexamethylenebisphthalimide, 4,4'-bisphthalimidodiphenylether, 3,4'-bisphthalimidodiphenylether, 3,3'-bisphthalimidodiphenylsulfone, 4,4'-bisphthalimidodiphenylsulfone, and 4,4'-bisphthalimidodiphenylmethane.

16. The process of claim 1 wherein the low-molecular-weight compound is selected from the group consisting of N,N'-diethylpyromellitimide, N,N'-dibutylpyromellitimide, N,N'-dihexylpyromellitimide, N,N'-dioctylpyromellitimide, N,N'-didecylpyromellitimide, N,N'-dilaurylpyromellitimide, N,N'-dicyclohexylpyromellitimide, and N,N'-diethyl-1,4,5,8-naphthalenetetracarboxylic acid 1,8-4,5-diimide.

17. The process of claim 1 which further comprises heat-setting the film-like or fibrous structure after the stretching step (2) and before the extracting step (3).

18. The process of claim 17 which further comprises heat-setting the stretched film-like or fibrous structure after the extracting step (3).

19. The process of claim 1 which further comprises heat-setting the stretched film-like or fibrous structure after the extracting step (3).

20. The process of claim 1 wherein the step (1) of forming the unstretched film-like or fibrous structure comprises melt-shaping the blend of the aromatic polyester and low-molecular-weight compound at a temperature in the range of 245° C. to 290° C.

21. The process of claim 1 wherein the low-molecular-weight compound is nitrobenzene, nitrotoluene or nitronaphthalene.

22. The process of claim 1 wherein the aromatic polyester is polyethylene terephthalate.

23. The process of claim 1 for producing a film-like structure wherein step (2) comprises stretching the resulting film-like structure to a stretch ratio, in terms of area, of from about 3 to 30.

24. The process of claim 1 for producing a fibrous structure wherein step (2) comprises stretching the resulting fibrous structure to a stretch ratio of from about 3 to 7.

25. A film-like or fibrous structure of an aromatic polyester, prepared by the process of claim 1, said structure substantially containing no low-molecular-weight compound or containing the low-molecular-weight compound in an amount of up to about 1 part by weight at most per 100 parts by weight of the aromatic polyester.

* * * * *